United States Patent

Bragdon

[11] Patent Number: 5,863,203
[45] Date of Patent: Jan. 26, 1999

[54] INTERMODAL TRANSPORTATION SIMULATION SYSTEM

[75] Inventor: Clifford R. Bragdon, Oakdale, N.Y.

[73] Assignee: Dowling College, Oakdale, N.Y.

[21] Appl. No.: 590,569

[22] Filed: Jan. 26, 1996

[51] Int. Cl.[6] .............................. G09B 9/02; G09B 19/16
[52] U.S. Cl. ............................ 434/29; 434/30; 434/60; 434/62; 434/307 R; 434/365; 395/500; 364/578
[58] Field of Search .................. 434/29, 30, 43, 434/55, 59, 61, 62, 63, 38, 66, 69, 118, 307 R, 308, 365; 472/59, 60, 61, 130; 348/61, 51, 58, 121, 123, 124, 578, 553; 364/578; 395/500; 345/145

[56] References Cited

U.S. PATENT DOCUMENTS

| | | | |
|---|---|---|---|
| 3,486,242 | 12/1969 | Aronson | 434/29 |
| 3,871,113 | 3/1975 | Crago et al. | 434/29 |
| 4,026,038 | 5/1977 | Sunter et al. | 434/29 |
| 4,041,283 | 8/1977 | Mosier | 434/29 X |
| 4,477,069 | 10/1984 | Crudgington, Jr. | 472/60 |
| 4,771,344 | 9/1988 | Fallacaro et al. | 348/51 X |
| 4,817,948 | 4/1989 | Simonelli | 434/63 X |
| 4,976,438 | 12/1990 | Tashiro et al. | 434/307 R X |
| 5,234,346 | 8/1993 | Rice | 348/58 X |
| 5,316,480 | 5/1994 | Ellsworth | 434/29 |
| 5,474,453 | 12/1995 | Copperman | 434/62 X |
| 5,662,523 | 9/1997 | Yasumaru et al. | 472/130 X |
| 5,707,237 | 1/1998 | Takemoto et al. | 434/63 X |

FOREIGN PATENT DOCUMENTS 0 479 422 A3  4/1992  European Pat. Off. .

*Primary Examiner*—Joe H. Cheng
*Attorney, Agent, or Firm*—Galgano & Burke

[57] ABSTRACT

An intermodal transportation simulation system comprising a ground transportation simulation node, a rail transportation simulation node, a maritime transportation simulation node and an air transportation simulation node. Each of these simulation nodes are interactive, interconnected and designed to provide a manned multi-sensory, e.g. visual, auditory, olfactory and tactile simulation.

10 Claims, 3 Drawing Sheets

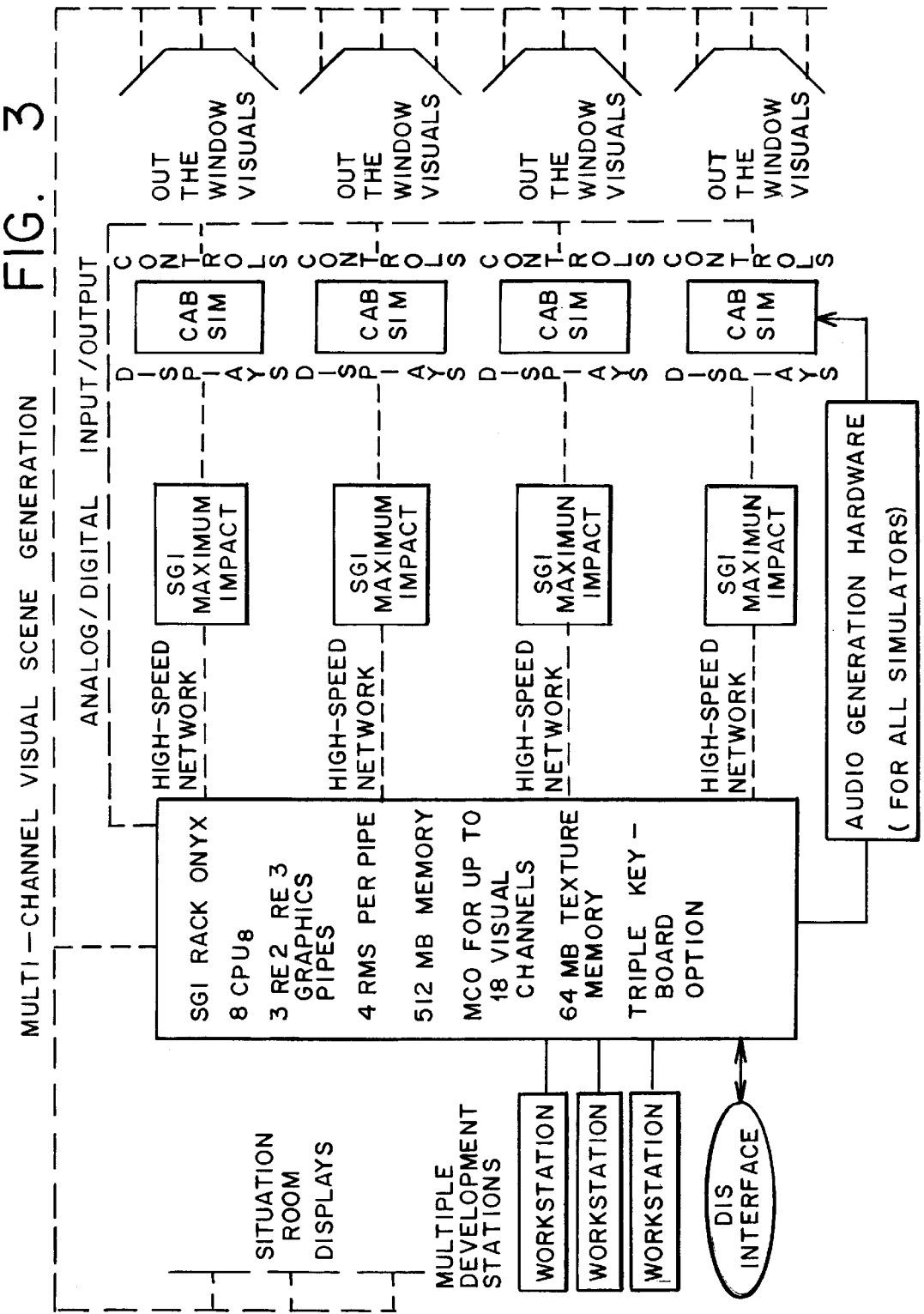

INTERMODAL TRANSPORTATION SIMULATION SYSTEM

The present invention is directed to an intermodal transportation simulation system which utilizes a plurality of interconnected simulation nodes which are configured to interactively simulate different modes of transportation.

BACKGROUND OF THE INVENTION

Local, state, regional and national departments of transportation are constantly seeking solutions to both new existing and long term transportation problems. The need for transportation solutions is particularly acute in regions experiencing population and economic growth which are typically accompanied by concerns for safety, security, mobility, productivity, the reduction of potentially harmful environmental impacts, as well as traffic congestion. Historically, within the transportation community, the emphasis has been on the growth of individual or single modes of transportation. In reality, however, these individual transportation modes do not actually function independently in society.

There is consequently a need to create safer, more integrated and improved transportation control systems in infrastructures, as well as to correspondingly build more efficient transportation and commercial vehicles. Due to the interdependencies of various modes of transportation, there is a need for a concurrent approach wherein a solution for one mode of transportation can be analyzed for its effect on one or more other modes. All of these transportation modes from an air, land, and maritime perspective must also relate to human factors and performance.

SUMMARY OF THE INVENTION

The present invention is directed to an intermodal transportation simulation system designed to provide a rich interplay of different transportation modes. One preferred embodiment of the present invention provides a system comprising a ground transportation simulation node, a rail transportation simulation node, a maritime transportation simulation node, air transportation simulation node and a human factors transportation laboratory acting as a fifth node. Each of these simulation nodes are designed to provide a manned multi-sensory, rather than a virtual visual reality, simulation.

In one preferred embodiment of the present invention, each of a plurality of transportation simulation nodes comprises mechanisms for simulating the visual, auditory, olfactory and tactile stimuli to provide a multi-sensory perspective to people stationed at those simulation nodes. Each node is interactive and interconnected with a central processing unit and at least one, preferably all, of the other nodes. In this manner, each of the nodes will receive corresponding input. Furthermore, when a person stationed at one of the nodes provides an input at his node, for example, changing the direction of a motorized vehicle which he is controlling in simulation, this change will be discernible at each of the other nodes. Therefore, a person piloting an aircraft or a cargo vessel will be able to experience the sights and sounds, as well as any olfactory and tactile sensations which would normally accompany the input provided at a separate simulation node.

In this manner, the various embodiments of the present invention provide a system for planning and achieving an integrated, compatible, intelligent transportation system which includes strategic deployment of plans and innovative technologies. Through the use of simulation technology, the present invention allows planners engineers and other professionals to analyze alternative technologies and strategies to provide a solid basis for a final recommendation prior to implementation. Traffic operations and management systems which can be utilized to mitigate congestion can be identified and recommended. Potential sources of congestion can be identified and alternate transportation routes analyzed to avoid problems before they occur. Furthermore, new traffic operations system techniques can be validated while considering environmental impact mitigation methods. This system provides a process of electronic rehearsal for strategic intermodal transportation planning and decision making. For example, new intermodal transportation system deployment strategies can be simulated prior to the expenditure of large sums of money to actually implement those strategies.

The various aspects of the present invention provide previously unavailable analytical tools useful to those considering multi and intermodal transportation issues as well as educational tools for transportation related personnel.

The present invention will facilitate improvements in safety, mobility, productivity, and reduce harmful environmental impacts, particularly those caused by traffic congestion.

BRIEF DESCRIPTION OF THE DRAWINGS

FIG. 3 is a block schematic of interconnections useful with hardware utilized with one embodiment of the present invention.

DETAILED DESCRIPTION

Figure 1:
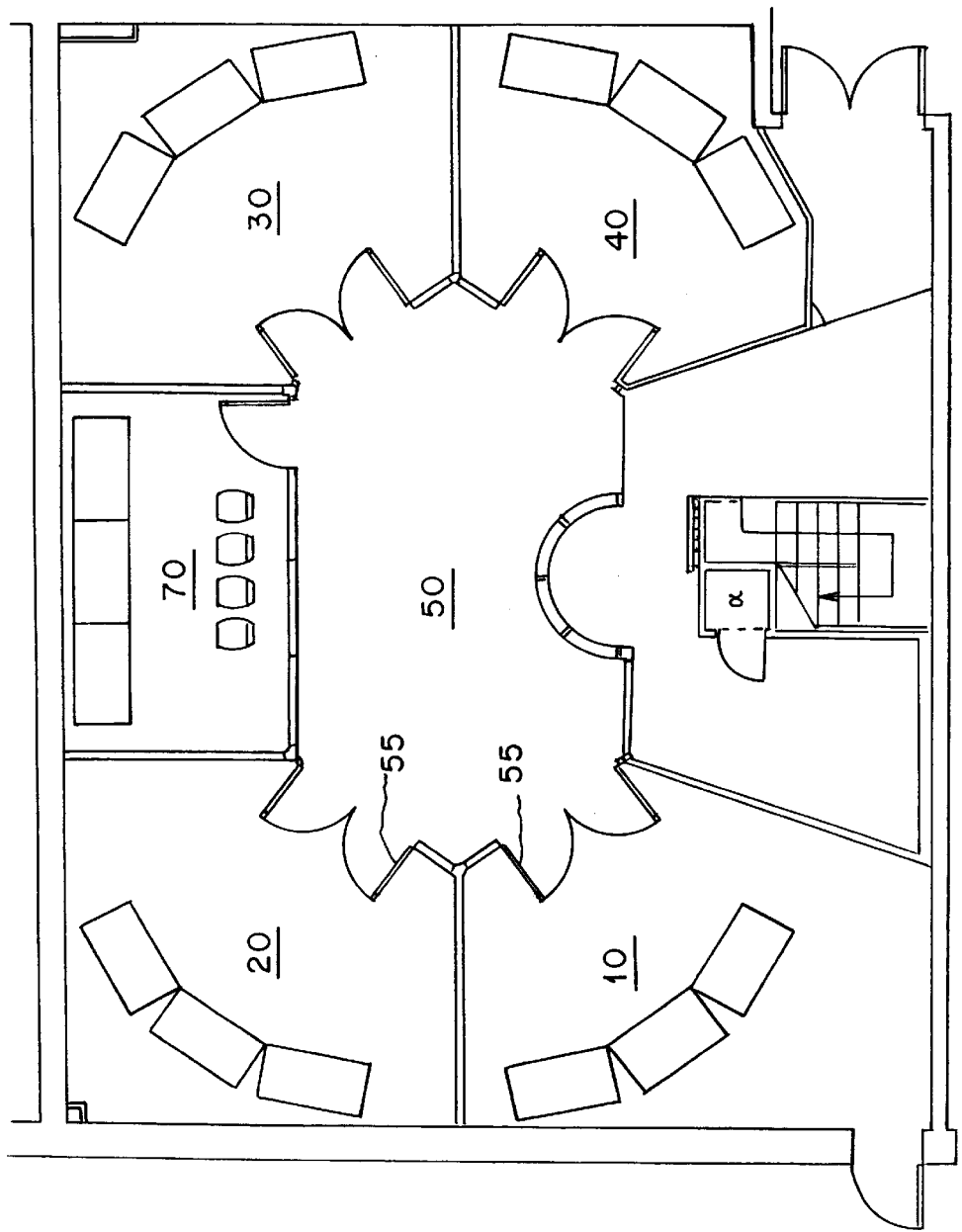
FIG. 1 is a ground level plan of one preferred layout of an intermodal transportation simulation system of the present invention.

The intermodal transportation simulation system technologically offers for a first time opportunity to electronically integrate, by modeling and simulation, the intermodal world of transportation (highway, maritime, rail, and air) using sensory modes (vision and acoustics). Virtual reality at present primarily involves the sense of vision. However, we live in a multisensory world. The intermodal transportation simulation system offers a major sensory breakthrough which couples intermodalism with technology that can better describe present day problems, as well as develop effective solutions for the 21st century.

In real life, vehicle operators receive stimuli from the interior vehicle as well as the external environment. The transportation environment emits visual, motion, auditory and olfactory cues during operation. In creating a simulation, an operator must be provided with these cues in order to experience a virtual transportation environment. The auditory system of the present invention provides motion-correlated, three-dimensional realistic sound sources, coordinated with the full ranges of the other sensory systems databases. The auditory database shall include sounds emanating from surface contact, from contact with three dimensional objects that the vehicle may encounter, from the vehicle during operation, and sounds that reflect the weather environment. Consequently, the intermodal transportation simulation system utilizes a high fidelity audio cuing system to supplement the visual and motion cues. This system provides directional aural cuing to simulate the sounds originating from the simulated vehicle, such as an engine, drive train, tire, pothole, road seams, rail or aerodynamic noises. These cues are correlated with the operating conditions of the simulated vehicle. The audio cuing is also capable of providing sources which normally originate from outside the vehicle, such as: random traffic noise, train or rail crossing warnings, boat whistles, reflection and doppler effects associated with approaching, passing and receding sound sources such as: emergency vehicles, stationary roadway and terrain features.

In its broadest interpretation, intermodalism refers to a holistic view of transportation in which individual modes work together or within their own niches to provide the user with the best choices of service, and in which the consequence of a single mode on all other modes are considered. The multimodal approach of the present invention addresses the creation of a virtual transportation system.

Some advantages of the present invention can be appreciated by first considering a highway mode. A highway system can intersect rail crossings and drawbridges, as well as service airports. At these junctions, traffic management decisions of one mode impact on the safety, flow and congestion of the other. Due to the interdependencies of the modes, the intermodal transportation simulation system creates conditions where transportation solutions can be validated in an intermodal transportation environment prior to implementation. For example, if an emergency condition on a freeway calls for a green wave to occur on the arterial streets, a rail crossing closure could prevent the rapid evacuation of vehicles and the passage of emergency vehicles. The intermodal transportation simulation system creates a virtual traffic system which permits advanced traffic management decisions made in one mode to be simultaneously viewed by all modes. At most transportation nodes, the real issue in operations is getting people from different entities to work together toward the efficient application of skills to manage resources which are controlled disparately. The intermodal transportation simulation systems of the present invention provide the platform to create successful simulations as a means to achieve improvements in safety, mobility, productivity, and reduce harmful environmental impacts.

The illustrated embodiments of the present invention comprise networked nodes to support the simulation of highway, aviation, rail and maritime modes, a situation review room, and an observation area from which each of the interlinked simulation nodes can be viewed. One embodiment comprises the following hardware components:

Hardware Components

1. Rack System Graphics Generation with (4) Deskside Nodes.
2. Rendering and Modeling Software and Development Tools.
3. Rear-screen Projection Cabinet Units ((7) one for each node, and three for the situation display).
4. Reconfigurable Crew Stations ((4) medium to low end, but with realistic interactive controls).
5. Systran Computer and Controls Interface (SCRAMNET reflective memory, D/A and A/D boards)
6. MAK VRLink Distributed Interactive Simulation (DIS) Interface Software.
7. Crystal River 3D Audio Bundles ((4) hardware and software).
8. Computer Peripheral Equipment (printer, terminals, etc.).
9. TELEX Audio Communication Equipment (microphones, headsets, control units, etc.).
10. Video Switching and Monitoring Equipment (4 to 1 switching units, monitors/repeaters).
11. Video/Ethernet/Signal Cables, Connectors, Adapters, etc.
12. Video Acquisition Equipment (cameras, VCR, scanners).
13. Acoustic Acquisition Equipment (keyboards, mixers, recorders, cassette players).

INTERMODAL TRANSPORTATION SIMULATION NODES

Each node is based on an open architecture which is flexible, reconfigurable, upgradeable, expandable, and nonproprietary. The system comprises flexibility to reconfigure each node as one large field of view, or several separate views via existing software. This design is intended to allow the systems of the present invention to directly interact with other study centers such as Georgia Tech's Institute of Technologies Human Factors Laboratory, FHWA, University of Iowa and Oak Ridge National Laboratories Training Center. This system is scaleable and easily expanded and upgraded. The image generation system is able to run popular CAD/CAM programs, such as Autocad and Intergraph, and GIS software, such as ArcInfo, Intergraph and ERDAS.

Each node meets these criteria:
1. Multi-Channel Image Generation, Open GL-based
2. High Resolution Rear-Screen Projection
3. Crew Station (Each cockpit is capable of being computer reconfigurable by displaying any of the four modes.)
   a. Reconfigurable Vehicle Consoles
   b. Vehicle Controls
4. 3D Spatial Sound System A multiprocessing graphics server (visual host) supports the four modes (graphics engines) which can operate independently or in combination, depending upon the scenario requirement. A high performance and efficient environment makes both application porting and new database development smooth and simple. Using a windowing hierarchical framework, each mode is detailed. An electronic interface links the simulation nodes with the situation review room, and the control and analysis functions.

Figure 2:
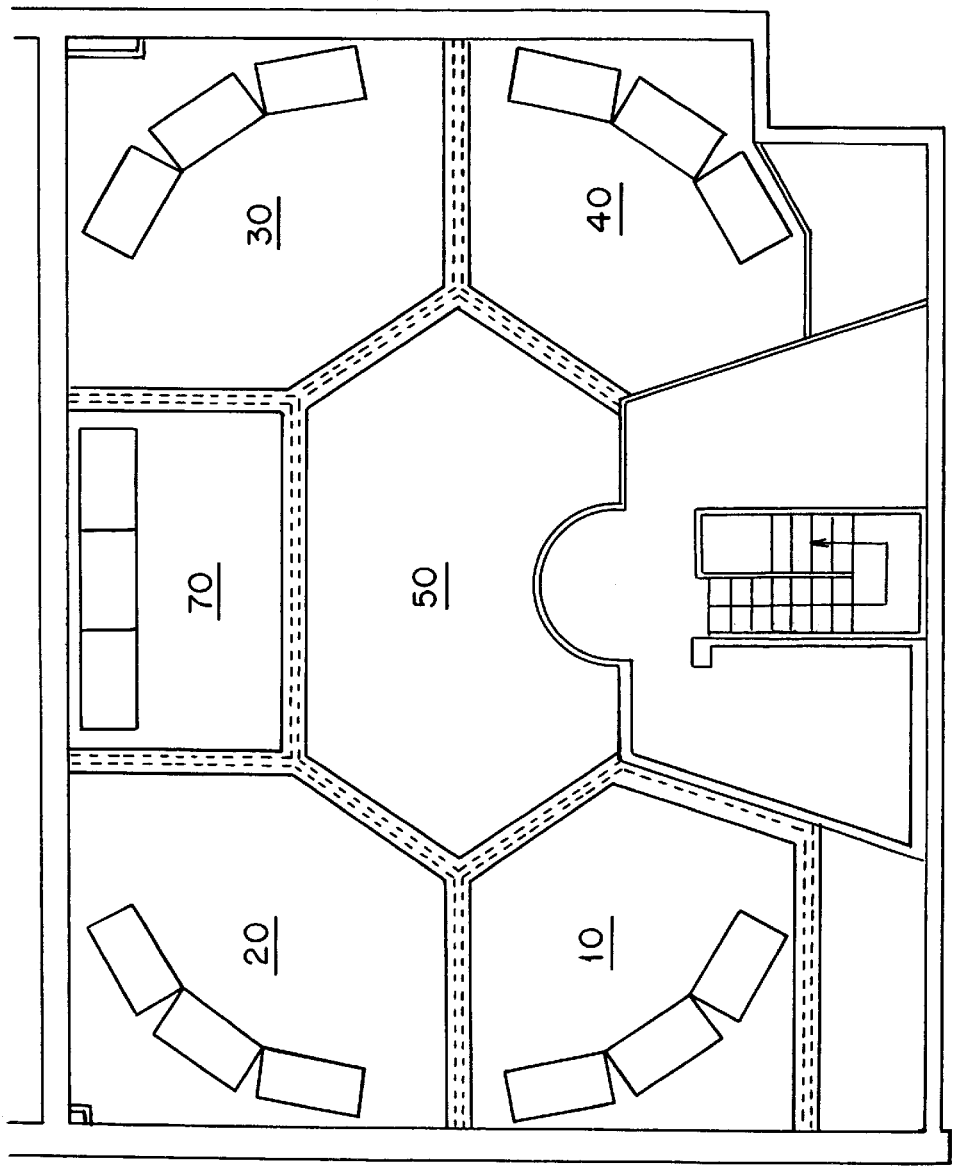
FIG. 2 is a view of the system shown in FIG. 1 from the mezzanine level.

The particularly preferred embodiment comprises a floor plan, a single floor rectangularly shaped and environmentally controlled space, as shown in FIGS. 1 and 2. Also as part of this plan is a situation review room where overall operations control and electronic interface are accomplished. Each of the modal nodes has its own dedicated space, physically arranged in a continuous flow pattern.

A high speed networking backbone supports each transportation node, for example, using a reflective memory system for each node and server, and an audio/video switching matrix. ScramNet may be used to integrate the various data sets by using a reflective memory system. The entire network is preferably operated over fiber optic cables to permit high speed, high volume data transfer.

A visual display screen system, preferably covering at least 120° field of view, is located at each of the modal nodes. Viewing capability, provided for example by three screens, is also provided in juxtaposition in the situation room capable of displaying a continuous scene, or multiple separate views. The simulator bays are light protected so that conflicting light sources do not interfere or create screen reflections. The visual images are switched in real time from one simulator bay set of images to another so that observers could keep track of what is occurring in each bay.

A three-dimensional sound system complements this wide screen array for digitally replicating environmentally-generated sounds. Fields of view by direct line of sight are available while a multi-media system capable of producing an environment incorporating a minimum of three senses (is offered in this situation review room).

Complete integration of these components provides the operating capability for four network nodes, the simulation system backbone, and the monitoring and control stations.

A LIBRARY OF SHARED PROGRAMMING AND MODELING TOOLS

Shared programming and modeling tools are provided to allow for easy modification of the databases, displays, and scenarios quickly, without relying on any particular supplier of the software tools or systems integrator. The tools include:

1) Complete software packages for implementation of 3D models, scenes, databases, and instrumentation.
2) Software for generation of specific database from digital data (DMA, DTED, DFAD, USGS DEMS).
3) Software for walking, flying, floating, or driving through databases.
4) Motion simulation with controls.
5) Vehicle cockpit instrumentation configuration software.

Most preferably, only applications which can be shared without algorithmic restructuring, are utilized.

A 3-D CFI CORRIDOR AT THE SYSTEM ENTRANCE

Using existing software, digital data is overlaid to generate geo-specific views. 3-D polygonal databases of specific areas, such as identified corridors for investment and/or study are provided. Images are rendered and textured to create an image library. Visualization and animation are combined so that the augmented realities of the physical world are integrated to create broadcast quality video. A set of geosonics are merged with the visual image to combine 3-D sight and sound (e.g., highway vehicle movement and associated noise generation).

FIGS. 1 and 2 are ground level and mezzanine level plans of one preferred embodiment of the intermodal transportation simulation system of the present invention. In this embodiment a first simulation node 10 comprises a ground transportation simulator, such as a motor vehicle, designed to provide auditory, visual, olfactory and tactile simulation which normally accompany operation of that type of vehicle. For example, this simulation node can comprise the cab of a delivery truck comprising all of the controls normally used by a truck driver. Furthermore, suitable audio generation hardware, motion simulators and aromatic generators are provided in order to realistically provide accurate simulation of real life conditions. The "out the window" visuals are advantageously displayed on a plurality of projection screens positioned around the mode room. While the illustrated projection screens are positioned to provide about a 120° field of vision, those skilled in the art will appreciate that this design can be modified as desired to provide a wider or narrower field of vision.

In a similar manner, second simulation node 20, third simulation node 30 and fourth simulation node 40 are provided to preferably simulate rail transportation, maritime transportation, and air transportation, respectively. Since the precise design of any particular simulation node is within the level of those skilled in the art, further detail of these nodes is not provided herein. The advantages of the present invention are achieved through the interconnection of these nodes in a coordinated, simultaneous fashion.

The system illustrated in FIGS. 1 and 2 also has an observation area 50 which is separated from each mode room at least in part by a transparent partition such as glass doors 55 which enable an observer to simultaneously view these simulations of each of the four mode rooms.

A situation review room 70 is provided for collecting information. For example, information relating to the efficiency of freight transportation, relocation of roads or rails, or the capability of changing the size of a warehouse. The intended purpose of this situation room is to integrate both visually as well as by the use of sound and aroma of solutions to identified problems on an integrated basis that will eliminate transportation conflicts thereby increasing productivity and efficiency.

The coordinated interconnection between the various mode rooms provides an opportunity to observe a given transportation area from each of the various modal perspectives. For example, if the area being considered is a proposed cargo terminal in a large city, designers can readily simulate and observe a multitude of proposed layouts from the perspectives of each of a tractor-trailer operator, the captain of a cargo ship, a helicopter pilot, and a railroad engineer prior to actual construction of the terminal.

FIG. 3 is a block diagram illustrating one example of suitable electronic components. The core processing system of this illustrated embodiment is a rack Onyx System available from Silicon Graphics Inc. (SGI) of Mountain View, Calif. This high end graphics computer comprises eight central processing units, three RE2 or RE3 graphic pipes with four raster managers per pipe. Additionally, 512 MB of four way interleaved memory and 64 MB of textured memory for storing data for the visuals are included. Multi channel option capability for splitting the images from each graphics pipe into up to six channels for display in either an "out the window" or at a work station are provided. Those skilled in the art will understand that this system can support up to 18 channels, though the illustrated embodiment is utilizing a maximum of 15 channels simultaneously.

This core processing system provides all out-the-window visuals (for vehicle simulators), vehicle dynamics, real-time models, and situation room displays. A triple-keyboard option provides three complete development stations for simulation visuals and models, utilizing SGI software toolsets and SGI Performer-based third party development software. Vehicle cab interfaces (controls) are accessed through specialized third-party VME hardware, providing both real-time analog and digital signals. Real-time data flow to the Node Simulation computers (SGI Max Impacts) is over high-speed networks (either standard ethernet, or third-party reflective memory or fiber bus networks). A physical and functional interface to external Distributed Interactive Simulations (DIS) is provided. Audio generation for the vehicle simulators (and optionally the Situation Room) can be centrally controlled from the Rack Onyx or optionally distributed to the Node Simulation computers (Max Impacts)

The SGI Maximum Impact computers are provided in each of the node rooms and are connected to the SGI Rack Onyx by a high-speed network. The primary purpose of the SGI Maximum Impacts is to provide the heads down display (s) for the vehicle cab environment, as well as the auditory, olfactory and tactile sensations. Stand alone capability for each node simulation is also possible by interfacing the controls directly to the Max Impact, as well as using an ICO to support multiple-channel visuals (at lower quality than provided by the REZ rack onyx system).

Reconfigurable stations (node simulators) for rail, air, ground, and maritime simulations are provided with realistic hands-on controls, heads-down visual display(s), out-the-window scenes, and sound generation.

Large-screen display projectors provide realistic visualization of out-the-window scenes for the vehicle cab simulators, as well as a video-wall for simulation monitoring in the situation room. Audio hardware provides realistic 3D spatial sound generation for the vehicle cab environments, plus sound monitoring for the Situation Room.

The present invention provides a unique transportation resource useful for the development of intermodal strategies to support and improve intelligent transportation system. While transportation-related agencies may be the primary beneficiaries of the research and development of the intermodal transportation simulation system, major freight, maritime, and rail companies can also benefit from the development of tools which relate to freight movements, hazardous materials movement, environmental impact, port planning, and emergency planning. In addition, this invention will enhance the opportunities for economic development where transportation is a key component. The economic development improvement can be observed locally, regionally, nationally and internationally.

The intermodal transportation simulation system offers specialized expertise and capabilities for the analysis of existing conditions and redevelopment strategies for the creation of intermodal linkages. The present invention allows planners to develop and evaluate comprehensive development plans which are consistent with the goals of the region, city or local transportation organization. The viability of alternative approaches for the use of land, space and transportation system design can be analyzed to develop sound capital improvement strategies. The intermodal transportation simulation system establishes a platform for further study focused on space use plans, infrastructure, environmental impact, creation of the three dimensional city, multimodal transportation facilities, land use alternatives, and new transportation alternatives, (i.e. MagLev, E-Bahn trains). The intermodal transportation simulation system also offers opportunity to analyze topics on the impact of transportation as an economic development and revitalization tool.

What is claimed is:

1. An intermodal transportation simulation system comprising:

a plurality of interactive transportation simulator nodes each of said nodes simultaneously simulating different modes of transportation, said transportation modes selected from the group consisting of ground transportation, rail transportation, maritime transportation and air transportation;

means for providing coordinated signals to each of said simulator nodes;

each of said simulator nodes comprising means for receiving input from a person stationed at said node and from said signal providing means, and means for providing discernible simulation to said person at said node in response to input from said person and from input at another node; and wherein input to a first simulator node by a person stationed at said first simulator node causes the generation of a signal to a second simulator node which is discernable by a person stationed at said second simulator node.

2. An intermodal transportation simulation system according to claim 1 comprising at least three simulation nodes.

3. An intermodal transportation simulation system according to claim 1 comprising at least four simulator nodes.

4. An intermodal transportation simulation system according to claim 1 wherein said simulator nodes provide visual and auditory signals.

5. An intermodal transportation simulation system according to claim 4 wherein said simulator nodes also provide olfactory signals.

6. An intermodal transportation simulation system according to claim 4 wherein said simulator nodes also provide tactile signals.

7. An intermodal transportation simulation system according to claim 1 wherein at least one of said nodes comprises controls for simulating the movement of an aircraft.

8. An intermodal transportation simulation system according to claim 1 wherein at least one of said nodes comprises controls for simulating the movement of a motor vehicle.

9. An intermodal transportation simulation system according to claim 1 wherein at least one of said nodes comprises controls for simulating the movement of a train.

10. An intermodal transportation simulation system according to claim 1 wherein at least one of said nodes comprises controls for simulating the movement of a floating vessel.

* * * * *